United States Patent [19]

Lassarat

[11] 4,095,335

[45] Jun. 20, 1978

[54] AUTOMATIC TUBE PULLER

[75] Inventor: Yves Albert Robert Lassarat, Sainte Adresse, France

[73] Assignee: Trouvay & Cauvin, Le Havre, France

[21] Appl. No.: 758,804

[22] Filed: Jan. 12, 1977

[51] Int. Cl.[2] .............................................. B23P 15/26

[52] U.S. Cl. ........................................ 29/726; 29/252; 29/427

[58] Field of Search ...................... 29/726, 252, 157.4, 29/427; 214/1 P

[56] References Cited

U.S. PATENT DOCUMENTS

| | | | |
|---|---|---|---|
| 2,697,872 | 12/1954 | Armstrong | 29/252 R |
| 3,369,287 | 2/1968 | Brochetti | 29/252 |
| 3,555,649 | 1/1971 | Rigot et al. | 29/252 X |
| 4,000,556 | 1/1977 | Ciminero | 29/252 X |

*Primary Examiner*—Victor A. DiPalma
*Attorney, Agent, or Firm*—Naylor, Neal & Uilkema

[57] ABSTRACT

An improved tool is provided for the removal of tubes from heat exchangers. First a mandrel is threaded into the end of a tube. The present tool is then fitted over the mandrel and is responsive to trigger-actuated hydraulic and/or pneumatic control means to automatically cause the tool to grip the mandrel and thereafter move the mandrel with its attached tube away from the tube sheet of the heat exchanger.

6 Claims, 7 Drawing Figures

AUTOMATIC TUBE PULLER

SUMMARY OF THE INVENTION

An object of the invention is to provide a tube removal tool for heat exchangers, and related or analogous usages, enabling easier removal of tubes and simpler and more efficient tube bundle maintenance and repair.

A further object of the invention is to provide such a tube removal tool with means for automatically connecting and disconnecting the tool to a mandrel which is inserted and threadably connected to a tube to be removed.

Another object of the invention is to provide such a tube puller tool with a combined hydraulic and pneumatic operating system.

Other objects and advantages of the invention will be apparent from the following description taken in conjunction with the drawings forming part of this specification, and in which.

DESCRIPTION OF THE INVENTION

Figure 1:
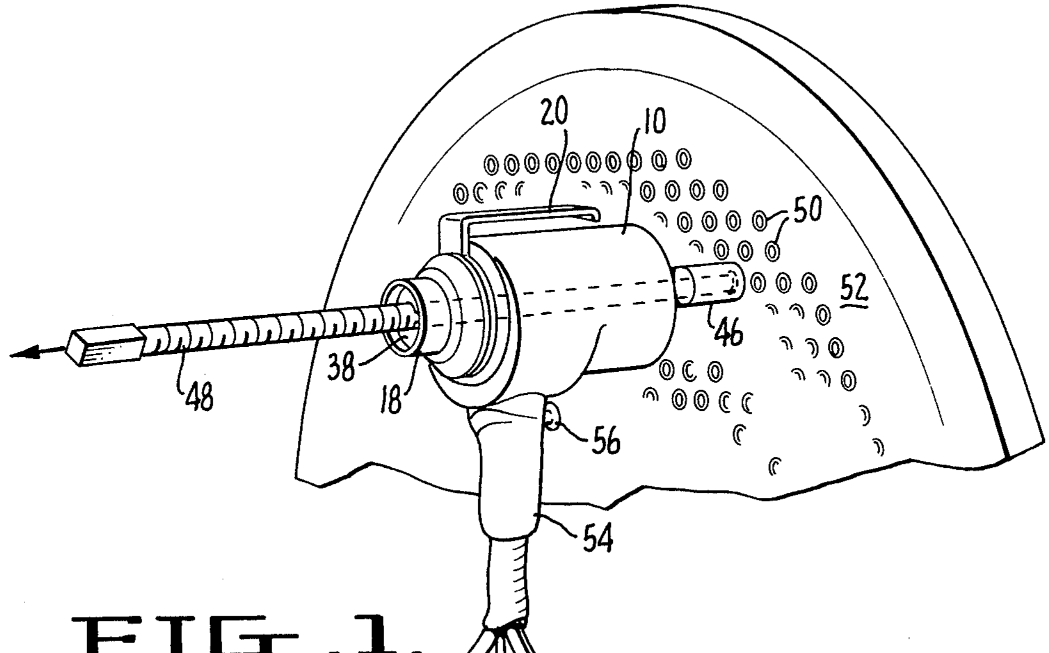
FIG. 1 is a view in perspective of the tube puller of the invention disposed in operating relation through a tube pulling mandrel with a tube to be removed from a heat exchanger.
Figure 1:
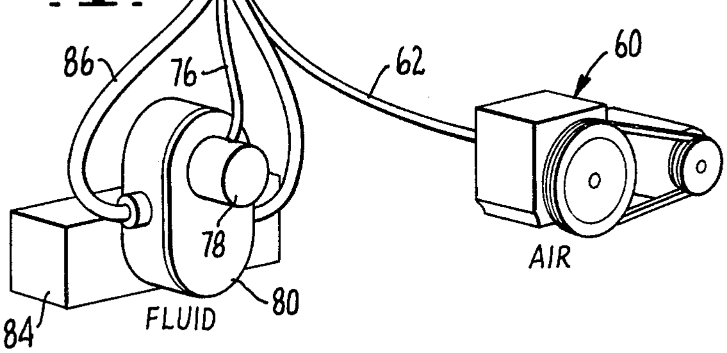
Figure 3:
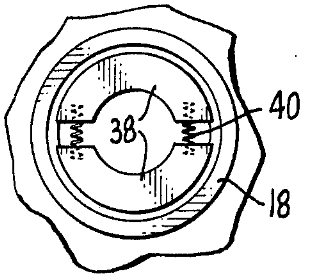
FIG. 3 is a view taken along lines 3—3 of FIG. 2.
Figure 2:
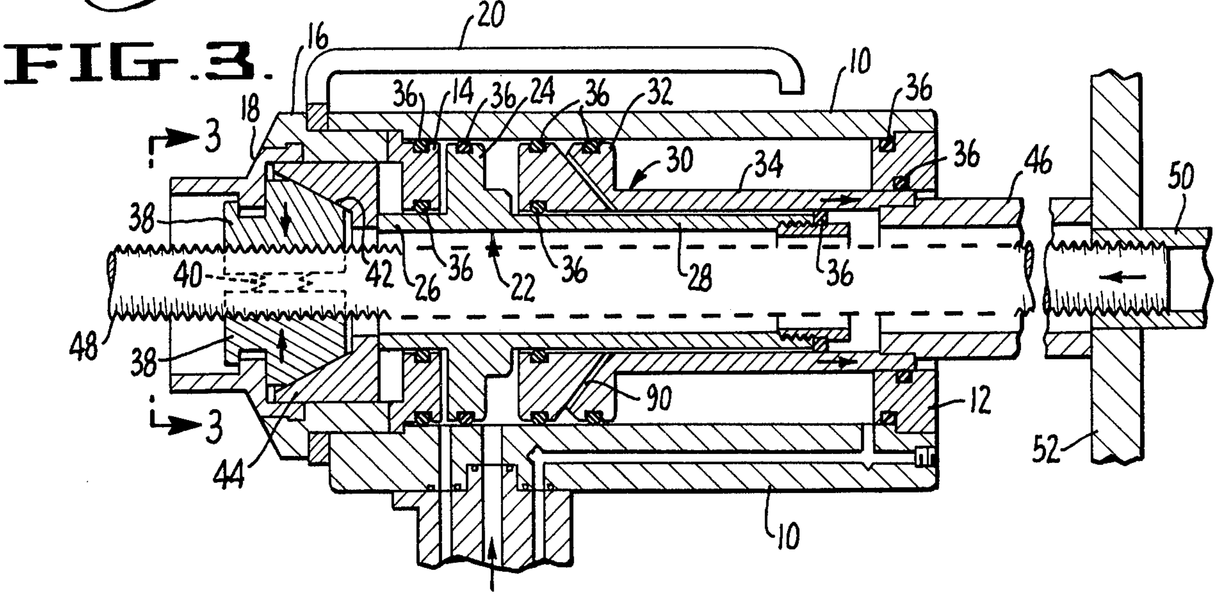
FIG. 2 is a view in diametral cross-section of the tube puller of FIG. 1.

The device or tool comprises a cylinder 10, front saddle or gland ring 12, rear plate or gland ring 14, rear coupling 16 and a jaw lock or retainer 18. These parts are fixedly positioned and attached with respect to each other but are disconnectable. A handle 20 is provided for overhead support of the device by a cable and pulley system, not shown.

Slidably disposed within the cylinder 10 is a clamping piston 22 having a head 24, a rearwardly directed sleeve portion 26, and a forwardly directed sleeve portion 28. A pulling piston 30 having a piston head 32 and a forwardly directed sleeve 34 is also slidably disposed within the cylinder 10. Suitable seals or O rings 36 are provided as shown.

The tube puller is provided with mandrel-gripping jaws 38 which are urged apart by springs 40. The jaws 38 are provided with conical surfaces 42 which bear against the complemental surface of a female cone member 44.

Removably attached to the pulling piston 30 is a pulling piston adapter tube 46. The tube puller further comprises a threaded mandrel 48. The mandrel is screwed into the heat exchanger tube 50 which is to be removed, as by the use of an impact tool or a ratchet wrench. The pulling device is then passed over the mandrel so that the adapter tube 46 bears against the tube sheet 52.

The device is provided with a grip 54, a trigger-type valve control element 56, a spring-urged spool valve 58 (FIG. 4), a compressed air source 60, an air input line 62 to the pulling device, or gun, pressure chamber 64, an outlet line 66 from the chamber 64 to the valve 58, a valve conduit 68 adapted to connect line 66 with line 70 which leads to gun pressure chamber 72, a valve conduit 74 adapted to connect line 66 with line 76 so that the air source 60 may drive an air motor 78, a fluid pump 80 adapted to be driven by the air motor 78 and to pump oil 82 from sump 84 through line 86 to gun pressure chamber 88.

Figure 4:
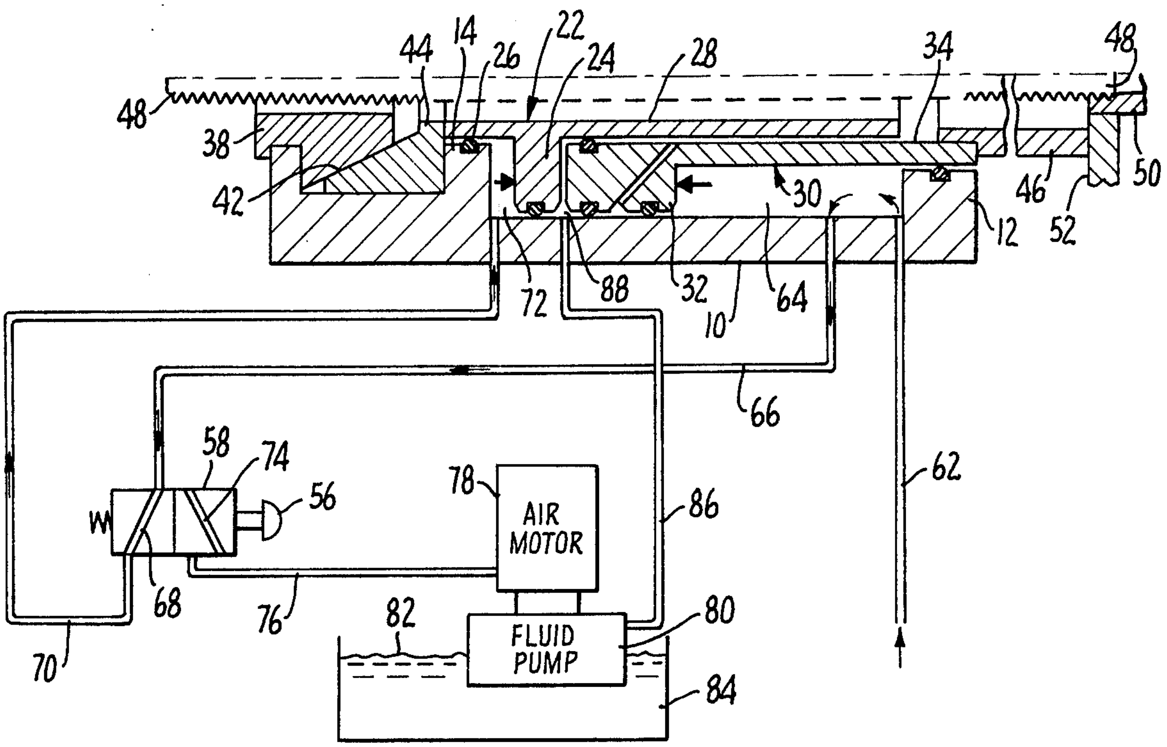
FIG. 4 is a semi-schematic view showing the operating parts of the tube puller in unlocked or unclamped relation to the mandrel, i.e. just prior to the commencement of a tube removal sequence.

As previously indicated, the gun is conditioned to commence a tube pulling operation by threadably engaging the mandrel with the tube to be pulled and sleeving the gun over the mandrel so that the adapter tube 46 bears against the tube sheet 52. This sets the gun up in the starting position of FIG. 4 in which chambers 64 and 72 are subjected to air pressure at a normal value of about 100 psi. This serves to position the pistons 22 and 30 as shown in FIG. 4.

Next, the trigger control 56 is pressed. This causes the air pressure in chamber 72 to bleed to the atmosphere. As this occurs, the air pressure in chamber 64 pushes the pistons 30 and 22 toward the rear of the gun to cause the sleeve portion 36 of piston 22 to impart a linear motion rearwardly to the female cone member 44. As the latter moves toward the rear of the gun it exerts a radial force on the jaw segments 38 to bring them into gripping engagement with the mandrel 48. At the same time the air is bled from chamber 72 and the mandrel jaws are engaged with the mandrel, valve conduit 74 interconnects lines 66 and 76 to drive the air motor 78 and cause the latter to drive the fluid pump 80. This delivers oil, or other hydraulic fluid, to chamber 88 under a pressure of normally about 10,000 psi. The above-described action of the air, which acts more rapidly than the hydraulic flow, has occurred before the effective buildup of oil pressure in chamber 88. The buildup of hydraulic pressure in chamber 88 begins to drive piston 30 toward the forward end of the gun, as shown in FIG. 5, to commence the tube pulling operation.

Figure 5:
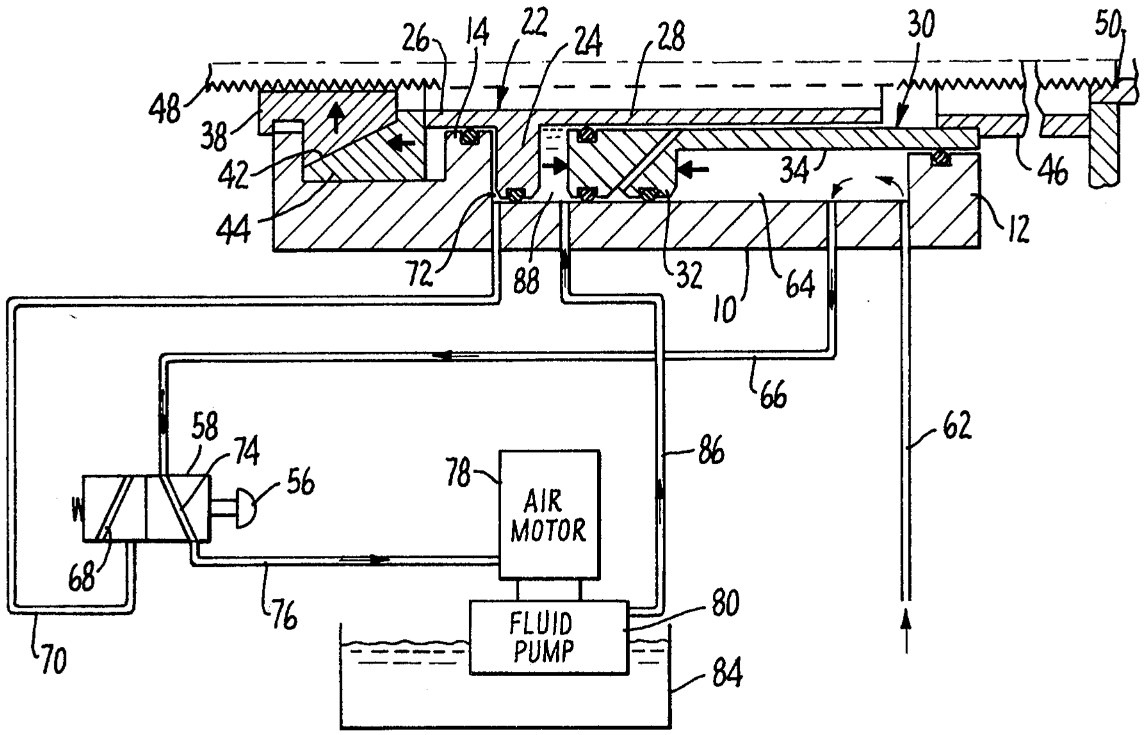
FIG. 5 is a semi-schematic view like FIG. 4 but showing the tube puller in clamped relation to the mandrel just prior to the start of the tube pulling operation.
Figure 6:
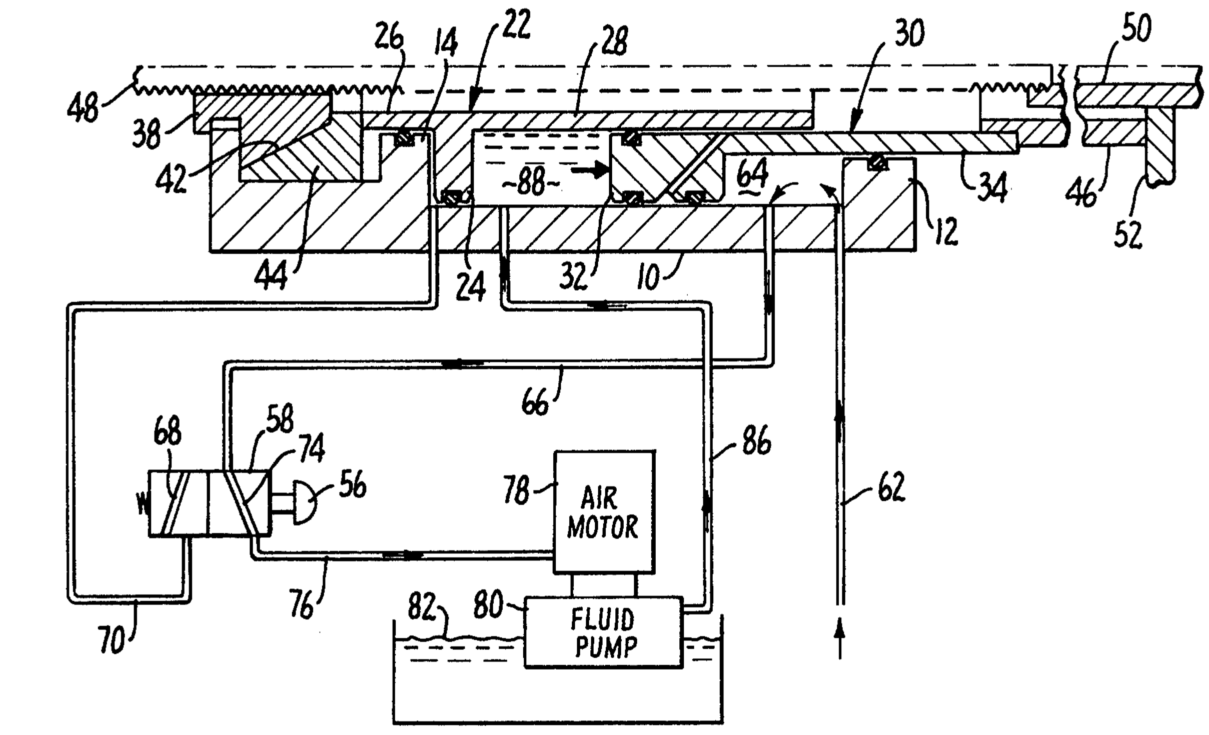
FIG. 6 is another semi-schematic view showing the tube puller in an actual tube pulling operation.

In FIG. 6, the operation that started in FIG. 5 continues and piston 30 is driven toward the forward end of the gun in the tube pulling operation, i.e. the gun except for the piston 30 is being driven to the left in FIG. 6 to impart a like movement to the mandrel and the tube being pulled. It is to be particularly pointed out that the hydraulic pressure in chamber 88 is causing the pistons 22 and 30 to be moved apart, i.e. causing the jaws 38 to be maintained in gripping relation with the mandrel and causing the jaws to be driven to the left to produce the desired tube pulling.

Figure 7:
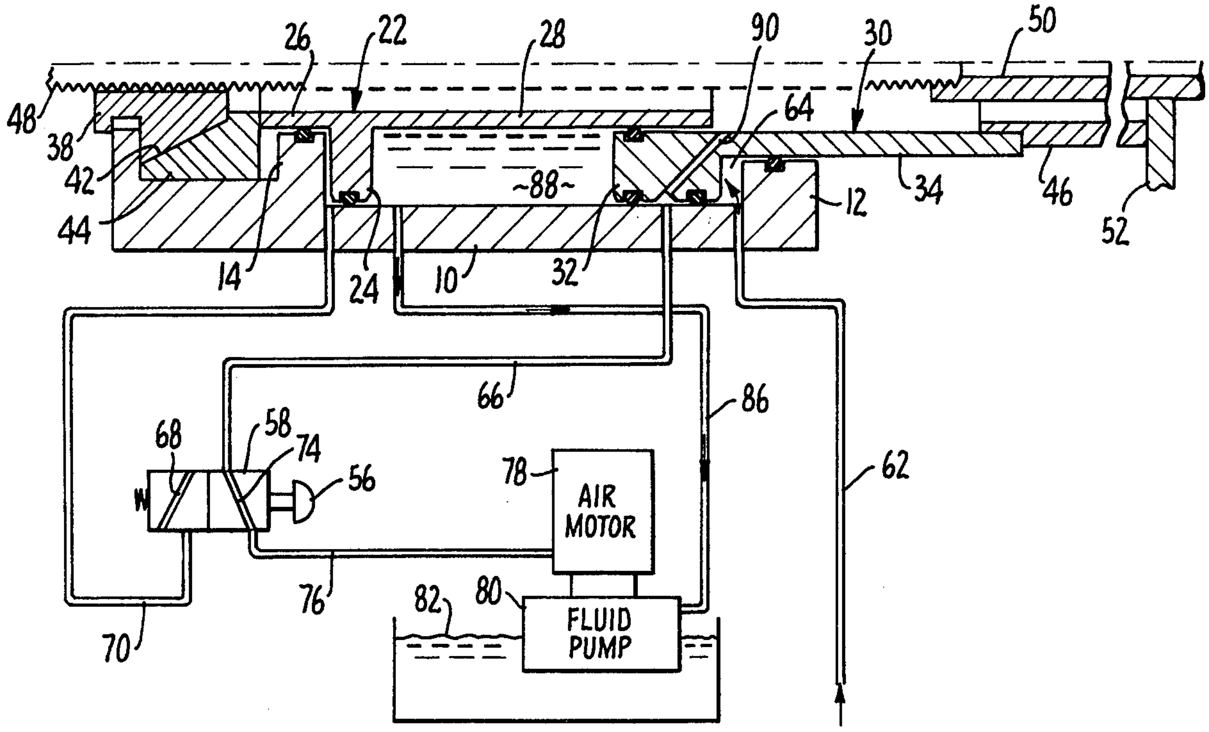
FIG. 7 is another semi-schematic view, this one illustrating the tube puller at the end of a tube pulling operation and illustrating the operation of an overstroke prevention system with which the tube puller is provided.

FIG. 7 indicates the condition of the system at just about the end of the tube pulling operation. It will be noted that the piston head 32 has shut off communication through the chamber 64 of air line 62 and 66, connecting the line 66 to atmosphere through porting 90 in piston 30, thereby turning off the air motor and the fluid pump driven thereby. Oil from the chamber 88 starts to return to the sump under the counterpressure of the air in chamber 64. The net result of this is that the high pressure condition in chamber 88 is terminated at the end of the tube pulling stroke but before the piston head 32 slams into the front saddle 12, at which point, if the high pressure were still operative in chamber 88, there would be dangers of blowing the hydraulic seals as well as the occurrences of other damages due to piston overstroke. It is also to be pointed out that if the mandrel 48 were to break during the tube pulling operation it still would remain retained by the jaws 38 and therefore the operator would not be endangered by such breakage.

After the FIG. 7 operational phase, the operator releases the trigger 56 to allow the valve spool 58 to return under the urging of its loading spring to the position shown in FIG. 4. This shuts off the supply of air to the air motor 78 and causes the oil pump 80 to stop. Air returns to chamber 72 to move the piston 22 forward with the female cone member 44 to which it is attached, thus allowing the mandrel jaws 38 to move apart under the urging of the springs 40, thereby disengaging the jaws from the mandrel. Since at this point there is no residual oil pressure in chamber 88, the air pressure in chamber 64 returns the piston 30 to the FIG. 4 position, exhausting the oil from chamber 88 back into sump 84.

It will be appreciated that the apparatus constituting the subject invention is in a broader sense a tension applicator device or gun which may be used in various environments where axial loading is a requirement, such as in stud and bolt tensioning, concrete prestressing, cable tensioning, and the like.

It is also to be pointed out that the motive power system for the gun can be rather widely varied. For example, an air-operated pump may be employed to supply only hydraulic fluid to all of the chambers 64, 72 and 88 or an electric pump can be used to supply only hydraulic fluid to these three chambers.

The drive and control system for the gun, as well as the gun itself, are subject to other modifications and adaptations which will readily occur to those skilled in this art.

I claim

1. Apparatus comprising a cylinder, a pair of pistons mounted for axial movement within said cylinder, means defining an axial passageway extending through said cylinder and said pistons for the accommodation of an elongate member to which an axial force is to be applied, jaw means carried by said cylinder adapted to close and grip said member and open and release said member, means to move said pistons apart, means responsive to the movement of one of said pistons away from the other to close said jaw means into gripping engagement with said member, a fixed reaction member, and means responsive to the movement of the other of said pistons away from said one piston to thrust against said reaction member and thereby apply an axial force to said elongate member through the medium of said jaw means.

2. Apparatus comprising an annular housing having forward and rearward ends, a first annular piston disposed for two-way movement therein having a head and having forwardly and rearwardly axially directed sleeve portions, a second annular piston disposed for two-way movement therein having a head and having a forwardly axially directed sleeve portion, said second piston being mounted upon the forwardly directed sleeve portion of said first piston, complemental jaw members mounted for closing and opening movement adjacent the rearward end of said housing, an operative connection between the rearwardly directed sleeve portion of said first piston and said jaw members to close said jaw members when said first piston is moved rearwardly in said housing, said forwardly directed sleeve portion of said second piston being adapted to project forwardly in the forward end of said housing upon forward movement of said second piston in said housing, and drive means to move said piston heads apart comprising fluid pressure applicator means adapted to deliver fluid under pressure into said housing between said piston heads.

3. Apparatus comprising an annular housing having forward and rearward ends, a first annular piston disposed for two-way movement therein having a head and having forwardly and rearwardly axially directed sleeve portions, a second annular piston disposed for two-way movement therein having a head and having a forwardly axially directed sleeve portion, said second piston being mounted upon the forwardly directed sleeve portion of said first piston, complemental jaw members mounted for closing and opening movement adjacent the rearward end of said housing, an operative connection between the rearwardly directed sleeve portion of said first piston and said jaw members to close said jaw members when said first piston is moved rearwardly in said housing, said forwardly directed sleeve portion of said second piston being adapted to project forwardly in the forward end of said housing upon forward movement of said second piston in said housing, drive means comprising fluid pressure applicator means operative to deliver pressurized fluid to said housing between said piston heads to move said piston heads apart in a sequence of, first, movement rearwardly in said housing of said piston to close said jaw members and then movement forwardly in said housing of said second piston, and flow control means for said applicator means operative in response to the movement forwardly of said second piston in said housing to a predetermined degree, but less than its capability for such forward movement, to shut down the flow of pressurized fluid to said housing between said piston heads and decrease the driving pressure being applied to said second piston to drive it forwardly.

4. The apparatus of claim 3 including means operable upon the occurrence of said decrease in driving pressure to commence driving said second piston rearwardly in said housing and to drive said first piston forwardly in said housing to restore the pistons to their initial positions and enable the opening of said jaw members, and spring means operative to open said jaw members upon movement of said first piston forwardly in said housing.

5. An hydraulic tube puller for the removal of tubes from heat exchangers and the like comprising a cylinder having front and rear ends, first and second annular, concentric pistons therein, said cylinder and pistons having defined centrally thereof an axially extending passageway adapted to accommodate an elongated mandrel which is threadably engaged at the tube sheet of an exchanger with a tube to be removed, complemental jaw members mounted at the rear end of said cylinder and disposed around said mandrel, means interconnecting said first piston and said jaw members and operable upon the movement of said first piston rearwardly in said housing to move said jaw members into gripping relation with said mandrel, and means connected to said second piston and operable upon the movement of said second piston forwardly in said housing to press against said tube sheet and drive the housing, jaw members and mandrel rearwardly to pull said tube rearwardly from said tube sheet.

6. An hydraulic tube puller for the removal of tubes from heat exchangers and the like comprising a cylinder having front and rear ends, first and second annular, concentric pistons therein, said cylinder and pistons having defined centrally thereof an axially extending passageway adapted to accommodate an elongated mandrel which is threadably engaged at the tube sheet of an exchanger with a tube to be removed, complemental jaw members mounted at the rear end of said cylinder and disposed around said mandrel, means interconnecting said first piston and said jaw members and operable upon the movement of said first piston rearwardly in said housing to move said jaw members into gripping relation with said mandrel, means connected to said second piston and operable after said jaw members have been moved into gripping relation with said mandrel and upon the subsequent movement of said second piston forwardly in said housing to press against said tube sheet and drive the housing, jaw members and mandrel rearwardly to pull said tube rearwardly from said tube sheet, means thereafter operable to sequentially move said second piston rearwardly and said first piston forwardly in said housing to terminate the application of a pulling force to said mandrel and enable the movement of said jaw members out of gripping relation with said mandrel, and spring means to move said jaw members away from said mandrel.

* * * * *